United States Patent [19]

Marks

[11] 4,020,795
[45] May 3, 1977

[54] CHOKE COLLAR FOR PETS

[76] Inventor: James A. Marks, 15207 Otsego St., Sherman Oaks, Calif. 91403

[22] Filed: May 11, 1976

[21] Appl. No.: 685,399

[52] U.S. Cl. .............................. 119/106; 119/156
[51] Int. Cl.² ...................................... A01K 27/00
[58] Field of Search ................... 119/106, 109, 156

[56] References Cited

UNITED STATES PATENTS

| | | | |
|---|---|---|---|
| 2,798,458 | 7/1957 | Odermatt | 119/106 |
| 3,006,322 | 10/1961 | Vitol et al. | 119/106 |
| 3,817,218 | 6/1974 | Bongiovanni | 119/106 |

*Primary Examiner*—Hugh R. Chamblee

*Attorney, Agent, or Firm*—Joel Halpern

[57] ABSTRACT

A choke collar for pets includes a stranded wire cable core having free ends each of which is given an enlarged head. A sheath of synthetic plastics material encloses the core substantially its entire length between the beads and is preferably impregnated with a pesticidal composition. First and second cooperable locking elements connect the free ends of the collar and provide for adjustment of the collar diameter, and a lock sleeve is slidably mounted on the sheath and is dimensioned to be positionable over the first and second locking elements to present a smooth external surface. A snap ring is slidable on the sheath to receive a leash.

5 Claims, 6 Drawing Figures

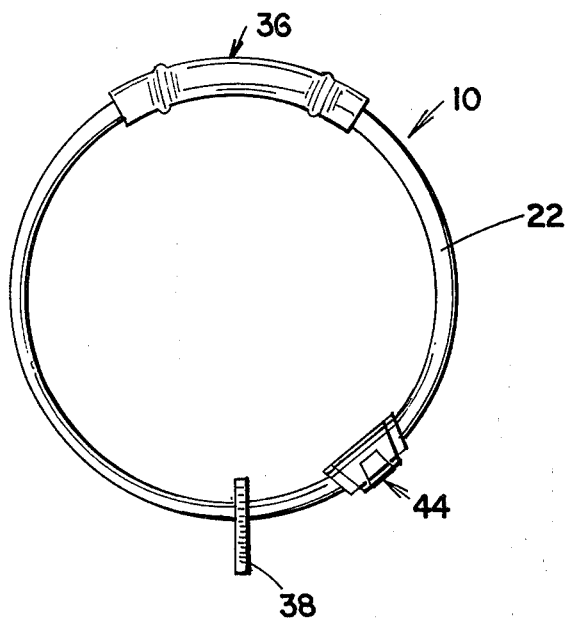
FIG. 1
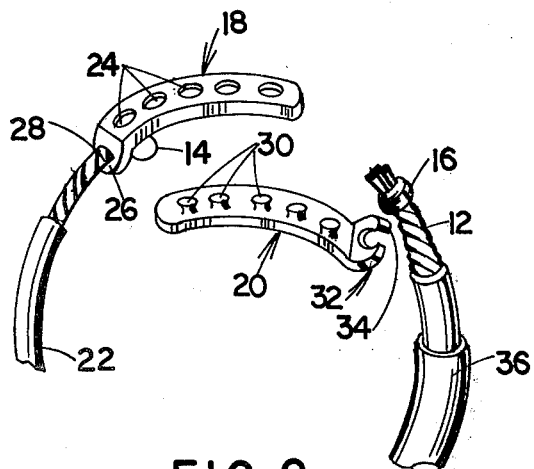
FIG. 2
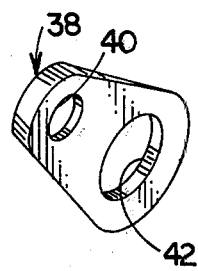
FIG. 3
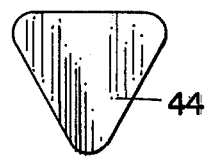
FIG. 4
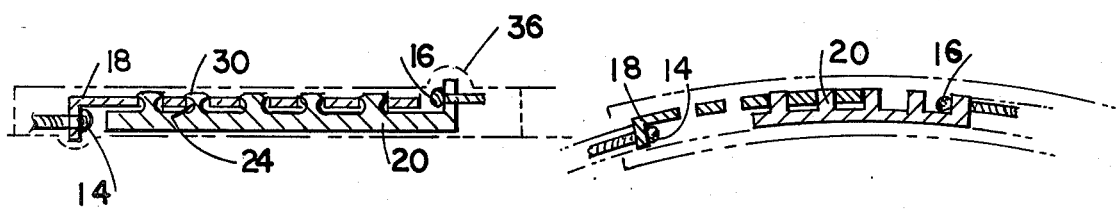
FIG. 5
FIG. 6

CHOKE COLLAR FOR PETS

BACKGROUND OF THE INVENTION

The present invention relates to choke collars for pets and more particularly to a ligh-weight collar which is snag-proof.

There have been numerous forms of construction for pet choke collars prior to this invention. Many have incorporated pesticidal compositions for the purpose of ridding the animal of fleas, ticks and like pests. Others have recognized that chain choke collars in use engage with the hair of the animal and on occasion damage the hair and skin on the neck of the animal. U.S. Pat. No. 3,817,218 issued June 18, 1974 to Carl G. Bongiovanni covers the chain element with a plactic tube. However, the collar is secured by means of a latch hook and ring which remain exposed. As is well known, dogs and cats frequently scamper about in an uncontrolled manner when off the leash and it often occurs that the exposed collar locking means, whether it be the buckle or latch hook or other equivalent locking elements, become snagged on an external object. Sometimes this results in physical injury to the animal. Also, when a pesticidal composition is to be employed it has been commonplace heretofore to utilize a separate collar containing such composition or to affix a device or receptacle containing the composition to the choke collar. In either event the user is inconvenienced andor the animal is more easily exposed to the risk of snagging with the attendant risk of injury.

SUMMARY OF THE INVENTION

It is one object of the invention to provide a choke collar for pets which is substantially snag-proof.

It is another object of the invention to provide a choke collar for pets which is both snag-proof and capable of affording pesticidal protection in a manner such that when required the pesticidal composition can easily be replenished.

Other objects and advantages of the invention will become readily apparent from the following description of the invention.

According to the present invention there is provided a choke collar for pets comprising in combination; a core consisting of a length of stranded cable the free ends of which each terminate in an enlarged bead, a sheath of synthetic plastics material enclosing the core throughout substantially its entirety between the beads, a first elongated locking element secured at one end thereof to the core adjacent one of the beads thereof and having fastening means thereon, a second elongated locking element having fastening means thereon cooperable with the fastening means on the first locking element for releasably securing the first and second locking elements in any of a plurality of collar length determining settings, the second locking element being adapted at one end thereof to be releasably secured to the core adjacent the other of the beads, a lock sleeve slidably mounted on the sheath and dimensioned to be positionable over the first and second locking elements to conceal the locking elements therebeneath, and means slidably secured to the sheath for connection to a leash.

BRIEF DESCRIPTION OF THE DRAWINGS

In order that the invention may be more fully comprehended it will now be described, by way of example, with reference to the accompanying drawings in which:

FIG. 1 is a front perspective view of a choke collar for pets embodying the features of the invention shown in connected relation as it would be worn by an animal;

FIG. 2 is a perspective fregmentary view of the choke collar of FIG. 1 in unconnected relation showing all of the essential components;

FIG. 3 is a perspective view of a suitable leashreceiving element;

FIG. 4 is a top plan view of an identification tag which can be used;

FIG. 5 is a side elevational view, partially in crosssection, showing the locking elements of the collar in locked relation and indicating in phantom line the lock sleeve positioned thereover; and FIG. 6 is a view similar to FIG. 5 showing the collar in its curved configuration as when worn by a pet and showing also the locking elements is an adjusted setting.

DETAILED DESCRIPTION OF THE INVENTION

Referring to the drawings there is shown generally, by reference numeral 10, a choke collar for pets such as a dog or cat. The collar includes a length of stranded wire cable 12 which forms the core of the collar. Desirably the strands are multi-filament metal to provide adequate strength. The length of the core may be selected in accordance with the general size of the animal with which the collar is to be used. Thus, for example, collars may range in size so as to be useful with small cats and dogs, medium size dogs and the larger breeds of dogs. As will become clear hereafter, the collar includes locking elements which afford further regulation of the collar diameter.

Each of the free ends of the collar core is provided with an enlarged bead 14, 16. Bead 14 serves to retain on the core one component 18 of the locking device whereas the other bead 16 serves to secure thereto the other component 20 of the locking device.

A sheath 22 of a synthetic plastics material encloses the core and extends over substantially its entirety between the bead portions thereof. Desirably the sheath contains a pesticidal composition which may be incorporated in the material of the sheath. For example, the sheath may be formed of a polymeric substance such as polyethylene or a polyvinyl material and may contain as the pesticidal compsition dimethyl dichlorovinyl phosphate. However, it will be appreciated that the particular material from which the sheath is formed may be selected from any of the many well known synthetic plastics materials, and the specific pesticidal composition may be similarly selected from commercially available compositions. The sheath, upon evaporation of all of the pessticidal composition, can be simply removed from the core of the collar and replaced with one in which the pesticidal composition is more effective.

The locking device for securing the collar on the animal consists of first and second locking elements 18, 20 as may be seen most clearly from FIG. 2. Locking element 18 is elongated, preferably in the shape of a strap, and is given a plurality of spaced apertures 24 throughout its length. At one end of locking element 18 a lug 26 is provided, preferably integral with the remainder of the element, and such lug is given a central opening 28 which can be urged over the bead 14 to secure the element to the core. Desirably the locking element is made of a resilient material so that it can be detached from the core for replacement in the event the apertures 24 become oversized in use and fail to effectively lock with the studs of element 20. However, this is not essential and the locking element 18 may be constructed for permanent attachment to the core of the collar.

Second locking element 20 is elongated and desirably configured as a strap in similar manner to element 18. Whatever shape is selected for element 18, however, the configuaration of element 20 should be complementary so as to permit close engagement of the two elements in their locked relationship. A series of studs 30 are provided on locking element 20 spaced throughout the length of the element as shown most clearly in FIG. 2. The studs are dimensioned and confugured to be releasably secured within apertures 24 of element 18. If desired the studs may be formed for a resilient material to facilitate insertion within the apertures and so as also to minimize wear of the apertures. One end of locking element 20 is formed with a yoke 32 having a pair of resilient legs 34 which may be separated to permit securement of the yoke and element 20 to the core of the collar adjacent bead 16. The resiliency of the legs 34 enables the user to remove the element 20 from the core when desired such as for replacement in the event the studs through use become too worn to effectively interlock in aperture 24. As can be seen in FIG. 6, in affixing the collar to an animal the user can select the particular studs and apertures to be connected in accordance with the size of the animal and the degree of tightness desired.

The choke collar includes a lock sleeve 36 which is slidably mounted on the sheath of the collar. It may be formed of an elastomeric or rigid material, preferably of a synthetic material having the desired physical characteristics. It is dimensioned so as to be positionable over the locking elements 18, 20 when in their interlocked relation. The lock sleeve thus affords protection against inadvertant unlocking of the collar as when it becomes snagged on an external object, and the lock sleeve also imparts to the collar, in the region of the locking elements, a substantially smooth external surface so as to substantially eliminate any possibility of snagging.

A leash-connecting element 38 may be secured slidably over the sheath and, as shown in FIG. 3, is given a pair of apertures 40, 42 which respectively enable securing of the element over the sheath and can receive the usual latch hook of a leash. An identification tag 44 is securable to the collar, and one type of tag which is useful is formed of polyethylene sheet which can be heated and then wrapped about the sheath of the collar.

From the foregoing it will be seen that an all-purpose choke collar has been provided which is of relatively simple construction and yet provides the required protection against snagging, eliminates the need for a separate pesticidal composition-containing collar, and which enables replenishing of the pesticidal composition when needed.

I claim:

1. A choke collar for pets comprising in combination:
a core consisting of a length of stranded cable, the free ends of which each terminate in an enlarged bead;
a sheath of synthetic plastics material enclosing said core throughout substantially its entirety between said beads;
a first enlongated locking element secured at one end thereof to said core adjacent one of said beads thereof and having fastening means thereon;
a second elongated locking element having fastening means thereon cooperable with the fastening means of said first locking element for releasably securing said first and second locking element in any of a pluraity of collar length determining settings, said second locking element being adapted at one end thereof to be releasably secured to said core adjacent the other of said beads;
a lock sleeve slidably mounted on said sheath and dimensioned to be positionable over said first and second locking elements to conceal said locking elements therebeneath;
and means slidably secured to said sheath for connection to a leash.

2. A choke collar according to claim 1, wherein said fastening means on said first locking element comprises a plurality of longitudinally spaced apertures and said cooperable fastening means on said second locking element comprises a series of longitudinally spaced stud element dimensioned and configured to be releasably secured in selected ones of said apertures.

3. A choke collar according to claim 1, wherein said one end of said second locking element is provided with a yoke the legs of which are resilient and separable to be detachably securable to said core.

4. A coke collar according to claim 1, wherein said sheath is formed of a material containing a pesticidal composition and is slidable relative to said core.

5. A choke collar according to claim 4, wherein said sheath is formed of a synthetic polymeric material containing as the pesticidal composition dimethyl dichlorovinyl phosphate.

* * * * *